United States Patent [19]

Cuccolini

[11] 4,188,828
[45] Feb. 19, 1980

[54] SELF-CENTERING DEVICE FOR GENERALLY LOCKING MOTOR VEHICLE WHEELS ON TO BALANCING MACHINE SHAFTS

[75] Inventor: Maria Cuccolini, Correggio, Italy

[73] Assignee: Corghi Elettromeccanica S.p.A., Correggio, Italy

[21] Appl. No.: 878,996

[22] Filed: Feb. 17, 1978

[30] Foreign Application Priority Data

Feb. 21, 1977 [IT] Italy ............................ 46821 A/77

[51] Int. Cl.² ........................................ G01M 1/06
[52] U.S. Cl. .................................................. 73/460
[58] Field of Search ............... 73/484, 460, 461, 462, 73/463, 464, 465, 466, 467, 468, 469, 470, 471, 472, 473, 474, 475, 476, 477, 478, 479

[56] References Cited

U.S. PATENT DOCUMENTS 3,991,620  11/1976  Fencl et al. ........................... 73/462
3,991,621  11/1976  Armbruster ........................... 73/479

Primary Examiner—Jerry W. Myracle
Attorney, Agent, or Firm—Brisebois & Kruger

[57] ABSTRACT

Self-centering device for generally locking motor vehicle wheels on to balancing machine shafts, comprising a normal drive flange rigid with the threaded balancing shaft; a sleeve slip-mounted on the balancing shaft and from the central region of which there projects a flange, the opposing faces of which are provided with telescopic means for centering and locking the rim of a wheel to be balanced; and a collar mounted on the balancing shaft and provided with swivel means for axially engaging and disengaging the collar with and from the balancing shaft.

5 Claims, 4 Drawing Figures

SELF-CENTERING DEVICE FOR GENERALLY LOCKING MOTOR VEHICLE WHEELS ON TO BALANCING MACHINE SHAFTS

SUMMARY OF THE INVENTION

This invention relates to a self-centering device particularly designed for rapidly and accurately locking motor vehicle wheel rims in general on to balancing machine shafts.

Motor vehicle wheels are notably balanced by locking the rim of said wheels on a rotating shaft which projects from the front of balancing machines.

On the balancing shafts of said machines there are also provided self-centering devices designed to lock the rim on to the balancing shaft.

Self-centering devices of known type basically comprise a drive flange rigid with the balancing shaft and against which the central part of the rim rests, the front face of the flange being provided with a set of threaded bores disposed on concentric circumferences and arranged to receive the locking screws of the various rims, as in the case of motor vehicles.

For balancing wheels with rims comprising a central bore, self-centering devices of known type also comprise a set of centering cones which are slip-mounted on to the balancing shaft and are clamped to the circumferential front edge of said central bore normally by a threaded sleeve screwed on to the free end of the balancing shaft.

Although balancing devices of the aforesaid type are suitable for the use for which they are intended, their design and structure leads to a whole series of drawbacks.

In locking the rim on to the drive flange by a set of bolts, a serious disadvantage is the fact that very often the operator has difficulty in tightening the various bolts with the same force, because of which inevitable centering inaccuracies arise which influence the exact balancing of the wheel, leading to the normal consequences deriving therefrom.

A further drawback deriving from said method of locking the rim is the excessive operating time required for balancing any given wheel, because the operator is compelled during the locking and unlocking stages to screw said bolts completely in and out respectively. Said locking method has also proved particularly uncomfortable for the operator, in that when locking the rim he has to support the wheel to be balanced and at the same time has to align the bores in the rim with the corresponding threaded bores provided in the drive flange.

This fact obviously leads to further loss of time, and requires the operator to exert a force which negatively affects his efficiency, in particular when there are many wheels to be balanced.

The operator is also required to exert a force greater than the previous force when tightening the bolts and when loosening them.

With regard to the second method of locking the rim, i.e. using a self-centering cone, this also gives rise to drawbacks because of the excessive operating time required to screw the sleeve on the balancing shaft and bring it into contact with the self-centering cone, then to firmly tighten said sleeve against the cone, and, when balancing is finished, to unlock said sleeve and then remove it from the balancing shaft.

The object of the present invention is to provide a self-centering device for generally locking motor vehicle wheels on to balancing machine shafts which is of simple, rational, functional and highly reliable construction, and which obviates the aforesaid drawbacks. According to the invention, the self-centering device proposed comprises, on the threaded end of a balancing shaft external to the drive flange, a sleeve slip-mounted on to said shaft and provided with a clamping flange on each face of which are disposed four hollow rods distributed in the same manner as the holes in the rim to be locked. The free end of these hollow rods is substantially configured as a cone frustum and in each of them there is inserted a centering pin, advantageously mounted on a resilient support, and slightly emerging from said cone frustum end when in its rest position. On that part of the balancing shaft which is external to said sleeve, there is disposed a collar or slider, to the rear end of which are hinged two opposing swivel levers contained in an axial longitudinal plane of the collar, their front ends being acted upon by resilient positioning means. Those faces of the rear ends of said levers which face the balancing shaft comprise a thread which is conjugate with that of said shaft, and two radial operating handles project from the collar.

Further objects and advantages of the invention, together with its operating characteristics and constructional merits will be more evident from the detailed description given hereinafter with reference to the accompanying drawings which show by way of non-limiting example one particular preferred embodiment thereof, and in which.

Figures 1, 2:
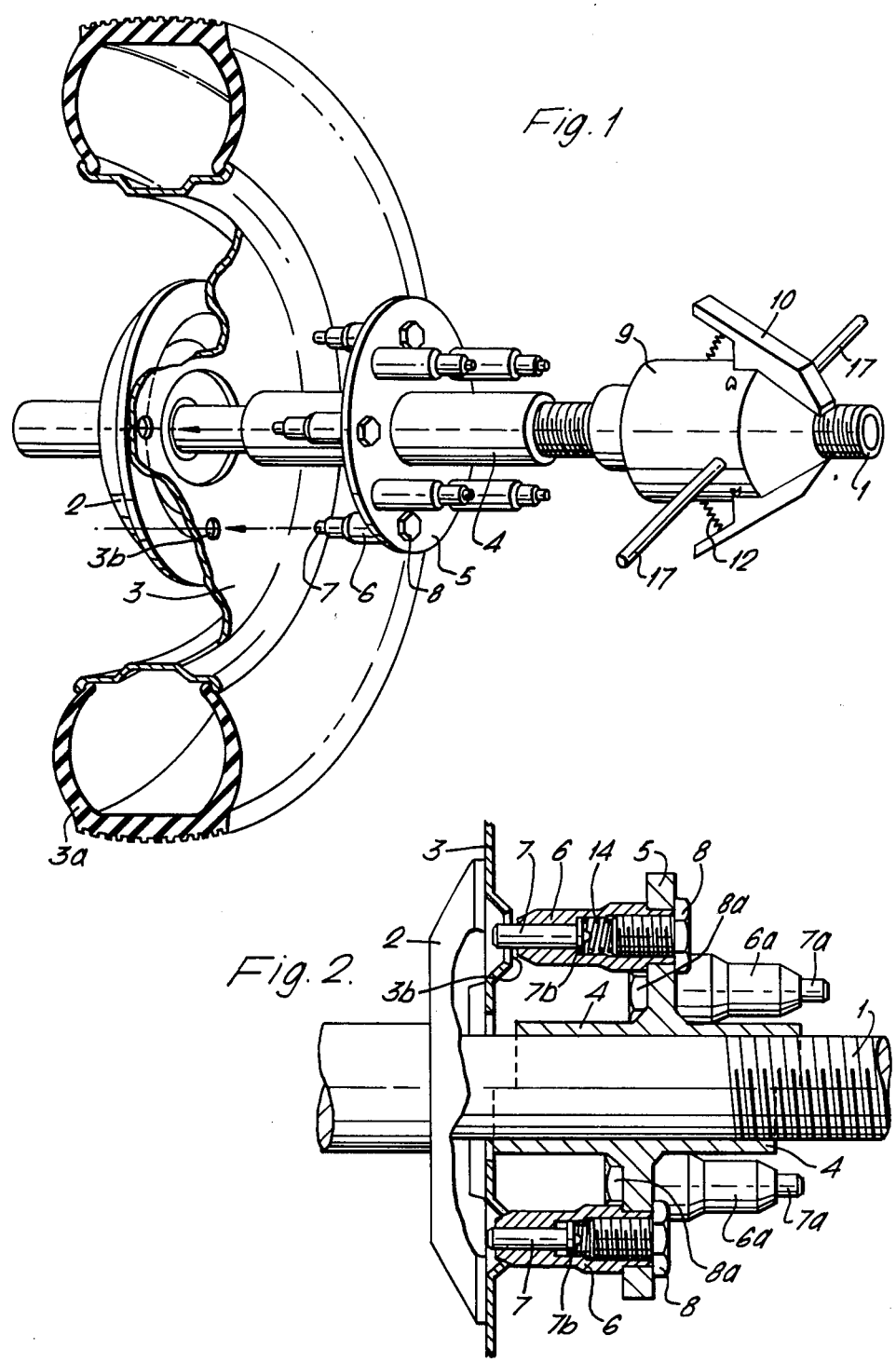
FIG. 1 is an external perspective view of the embodiment of the invention in which the rim is locked by its fixing holes.
FIG. 2 is a longitudinal section showing the operational stages of centering and locking the rim by the device of the previous figure.

Said figures, and in particular FIG. 1, show a balancing shaft 1, the terminal projecting part of which is suitably threaded. A drive flange 2, substantially of cup configuration, is locked on to said balancing shaft 1 by way of a suitable cylindrical skirt. In this respect, with reference to said figure, the central region of the drive flange 2 is constituted by a cavity which faces the free end of the balancing shaft 1 and is bounded, peripherally or circumferentially, by a circular rim lying in a plane orthogonal to the shaft 1. Proceeding towards the free end of this latter, a rim 3 provided with the pneumatic tire 3a is mounted thereon, and comprises, concentrically about its central region, four through holes 3b which are provided for its fixing to the motor vehicle.

On that part of the balancing shaft 1 external to said rim 3 there is mounted a sleeve 4, the inner diameter of which is substantially equal to the diameter of the shaft 1, and comprising a locking flange 5 branching substantially from its central region.

Four hollow rods 6 are fixed, by means of fixing screws 8, on that face of the locking flange 5 which faces the rim 3, and are distributed radially equidistant on a circumference having the same diameter as the circumference which connects the longitudinal axes of the through holes 3b of the rim 3. With reference to FIGS. 1 and 2 together, it will be noted that each of the rods 6 is provided with an axial cavity of different cross-sections, the larger of which faces the locking flange 5.

That end of said cavity which is in proximity to the flange 5 is threaded, and into it is screwed the corresponding fixing screw 8, so causing an external shoulder on the rod 6 to rest against that face of the flange 5 which faces the wheel rim 3. The threaded shank of the fixing screw 8 does not completely occupy that part of the cavity of greater diameter, and in the remaining part there is housed a compression spring 14, one end of which makes contact with the free end of the threaded shank of the screw 8. The other end of the compression spring 14 is in contact with a cap 7b provided at the end of a pin 7 which is inserted into that part of the cavity of smaller diameter. As can be clearly seen from the accompanying figures, the length of the pin 7 exceeds the length of that part of the cavity of smaller diameter, because of which when in its rest position it slightly emerges from the free end of the corresponding rod 6. Externally, said free end of the rod 6 is configured as a cone frustum, the minor base of which faces the rim 3, its major base slightly exceeding the diameter of the through holes 3b in the rim 3. In the manner heretofore described, and with particular reference to FIG. 2, a second set of four hollow rods 6a, each provided with a coaxial pin 7a, is provided on the rear face of the locking flange 5. The rods 6a are radially equidistant, and are distributed on a circumference the diameter of which is less than the circumference connecting the longitudinal axes of the rods 6. This is due to the fact that the through holes 3b are disposed on circumferences of different diameter, according to the diameter of the rim 3. Furthermore, the rods 6a are suitably staggered relative to the rods 6, for reasons of size.

Figure 3:
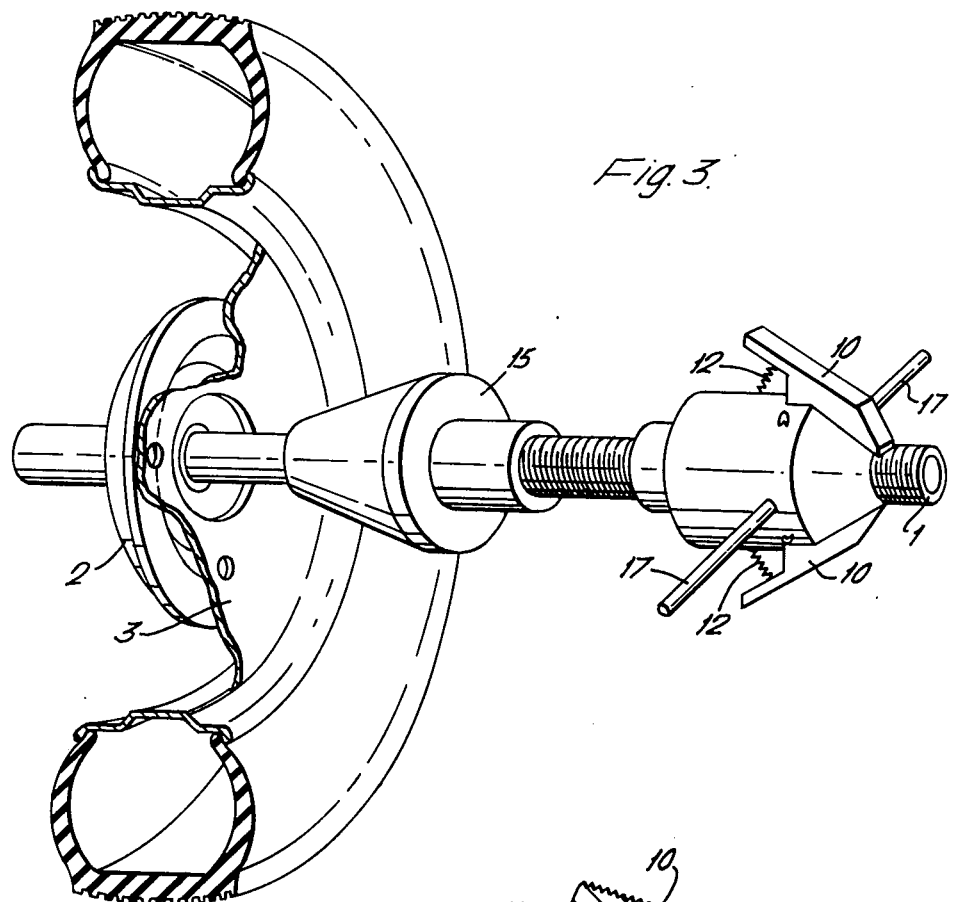
FIG. 3 is an external perspective view of the invention when using a normal self-centering cone.
Figure 4:
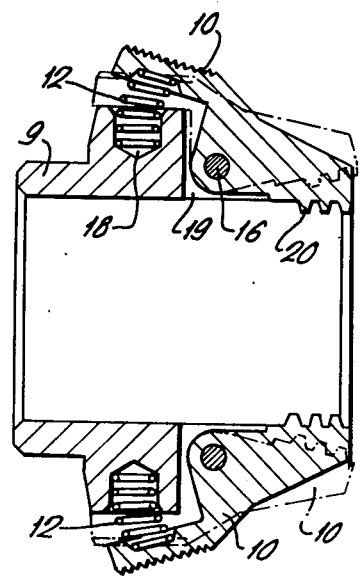
FIG. 4 is a longitudinal section through the collar with which the invention is provided.

In order to accommodate the diameters of all the rims 3 normally available commercially, the self-centering device according to the invention is provided with a suitable set of sleeves 4. With reference to FIGS. 1, 3 and 4, it will be seen that in proximity to the free end of the balancing shaft 1 there is provided a slider or collar 9, the inner diameter of which is substantially equal to the outer diameter of the threaded part of the balancing shaft 1. At its rear end, the wall of the collar 9 comprises a longitudinal diametrical slot 19 which houses two opposing shaped levers 10. These latter are hinged to the lateral walls of the slot 19 by two pins 16. Between the inner face of the front end of each shaped lever 10 and the outer wall of the collar 9 there is disposed a compression spring 12, one end of which is inserted into a radial seat 18 provided in the collar 9, its other end being housed in a cavity provided in said shaped lever 10. The inner face of the rear end of each shaped lever 10 is provided with a threaded sector 20, the thread of which is conjugate with the thread provided on the balancing shaft 1. Two opposing operating handles 17 project from the outer cylindrical surface of the collar 9, and extend orthogonally to the longitudinal plane containing said shaped levers 10.

Finally, and with particular reference to FIG. 3, a normal self-centering cone 15 is mounted on the balancing shaft 1, and is intended for insertion into the central bore provided in some of the rims 3 presently available commercially. Besides the said sleeves 4, the self-centering device according to the invention is also provided with a set of said self-centering cones 15 to cover the entire range of those rims 3 provided wih a central bore.

The invention as described and illustrated is used in the following manner.

When it is required to balance a motor vehicle wheel, the sleeve 4 or self-centering cone 15 and the collar 9 are removed from the balancing shaft 1. It will be firstly assumed that the rim 3 of the wheel to be balanced is provided with through holes 3b, in which case the rim 3 is mounted on the balancing shaft 1 and brought into proximity with the drive flange 2. On to the balancing shaft 1 is now mounted that sleeve 4, the locking flange 5 of which comprises four rods 6 distributed along a circumference of a diameter equal to that of the circumference which connects the longitudinal axes of the through holes 3b in the rim 3. The sleeve 4 is then slid down the balancing shaft 1 until the pins 7 become substantially in contact with the rim 3.

After said sliding, the operator raises the wheel to be balanced and inserts the free ends of the pins 7 into the through holes 3b.

At this point it is apparent that the centering of the rim 3 on the balancing shaft 1 is extremely simple and rapid, in that said insertion is practically simultaneous for all four pins 7. In this manner, as is apparent from the upper part of FIG. 2, the rim 3 becomes supported by the ends of the pins 7.

The operator now mounts the collar 9 on the balancing shaft 1, and by pressing the front ends of the shaped levers 10 towards the outer surface of the collar 9 is able to slide the collar 9 longitudinally until its front end comes into contact with the rear end of the sleeve 4. In this respect, as is apparent from FIG. 4, the pressure exerted by the operator on the front ends of the shaped levers 10 causes the compression springs 12 to become compressed, so that the threaded sectors 20 of said levers are kept from contact with the thread provided on the balancing shaft 1. As is apparent from the top part of FIG. 2, when the collar 9 is in contact with the sleeve 4, the inner face of the rim 3 rests on the drive flange 2 and the pins 7 support said rim 3. In this operating position or configuration, the operator releases the front ends of the shaped levers 10, so that the compression springs 12 extend and cause the threaded sectors 20 of said levers 10 to engage with the thread on the balancing shaft 1. This provides a screw-nut screw coupling, which enables the operator to lock the rim 3 against the drive flange 2 by turning the handles 17 clockwise. By operating the handles 17, the collar 9 and sleeve 4 are moved slightly towards the rim 3. During said movement, and as is apparent from the lower part of FIG. 2, the cone frustum ends of the rods 6 penetrate to an increasng extent into the through holes 3b in the rim 3, and at the same time the pins 7 slide in said rods 6 to cause the compression springs 14 to compress. The rods 6 cease their movement towards the rim 3 when the cone frustum end of said rods presses against the circumferential edges of the through holes 3b so that the rim 3 becomes firmly pressed against the drive flange 2. At this point, the balancing operation can be carried out in the usual manner. From the extensive description given heretofore, it is apparent that the rim 3 is unlocked in the reverse to the preceding. In this respect, it need only be stated that the removal of the wheel to be balanced from the balancing shaft 1 is extremely rapid and simple in that the components which centre and lock the rim 3 on the drive flange 2 need only be withdrawn from the balancing shaft 1. In this respect, a slight anti-clockwise rotation of the collar 9, easily executed by the operator because of the pair of opposing handles 17, releases the rim 3 from the drive flange 12, and a slight pressure on the front ends of the shaped levers 10 disengages the threaded sectors 20 from the thread of the balancing shaft 1. In this manner, the collar 9 is free to slide relative to said shaft 1, and can then be easily withdrawn therefrom. There is no difficulty in withdrawing the sleeve 4 from the balancing shaft 1, which then allows the rim 3 to be withdrawn therefrom, the balancing machine then being ready for balancing the next wheel. The centering, locking and release cycle for this latter is substantially the same as that heretofore described.

It will now be assumed that a rim 3 provided with a central bore is to be centred and locked, in which case when this rim has been mounted on the balancing shaft 1 the self-centering cone 15 and the collar 9 are then mounted thereon in succession as heretofore described. In this case, the rim 3 is centred by the cone frustum surface of the self-centering cone 15, and the rim 3 is locked on the drive flange 2 by the operator screwing the collar 9 along the thread of the balancing shaft 1.

In view of the description given heretofore, it is unnecessary to describe in detail the centering operation using the cone 15, as this is a normal device and the use and operation of the collar 9 have already been described in detail.

The invention is not limited to the single embodiment heretofore described, and modifications and improvements may be made thereto without leaving the scope of the inventive idea, the basic characteristics of which are summarized in the following claims.

What is claimed is:

1. A self-centering device for generally locking motor vehicle wheels on to balancing machine shafts, of the type comprising a drive flange rigid with a balancing shaft, the free end of which is provided with a thread, wherein a sleeve and collar are slip-mounted on said threaded part above the drive flange, said sleeve being provided with a flange which projects from the central region thereof and which comprises telescopic means for centering and locking the rim of a wheel to be balanced which are designed to come into alignment and make contact with the through holes with which said rim is provided; at the rear end of said collar there being provided swivel means for axially engaging and disengaging the collar with and from the balancing shaft, and means extending from the outer surface of said collar for the operation thereof, and which are orthogonal to the swivel plane of said swivel means.

2. A self-centering device as claimed in claim 1, wherein said telescopic centering and locking means are essentially constituted by a set of rods of a number equal to the number of through holes in the rim and radially equidistant along a circumference equal to that of these latter holes, said rods being parallel to the balancing shaft and each being provided with an axial through cavity with an internal shoulder, into which a screw for its fixing to the flange is screwed; said cavity also housing a compression spring which is compressed between the end of the threaded shank of said screw and a cap rigid with a pin which, in the rest position, slightly emerges from the free end, of cone frustum configuration, of the corresponding rod.

3. A device as claimed in claim 1, wherein a second set of rods completely identical to those previously mentioned project from the rear face of the flange, and are offset by a suitable angle relative to the latter rods and radially equidistant along a circumference of a diameter different from that along which said first set is distributed.

4. A device as claimed in claim 1, wherein said swivel engagement and disengagement means are essentially constituted by a pair of shaped levers hinged to the collar in a diametrical slot provided in this latter, between the front end of each lever and the outer surface of the collar there being disposed a return spring, the inner face of the rear end of said lever being provided with a threaded sector which is conjugate with the thread on the balancing shaft.

5. A device as claimed in claim 1, wherein the said operating means are essentially constituted by a pair of radially opposed handles.

* * * * *